UNITED STATES PATENT OFFICE.

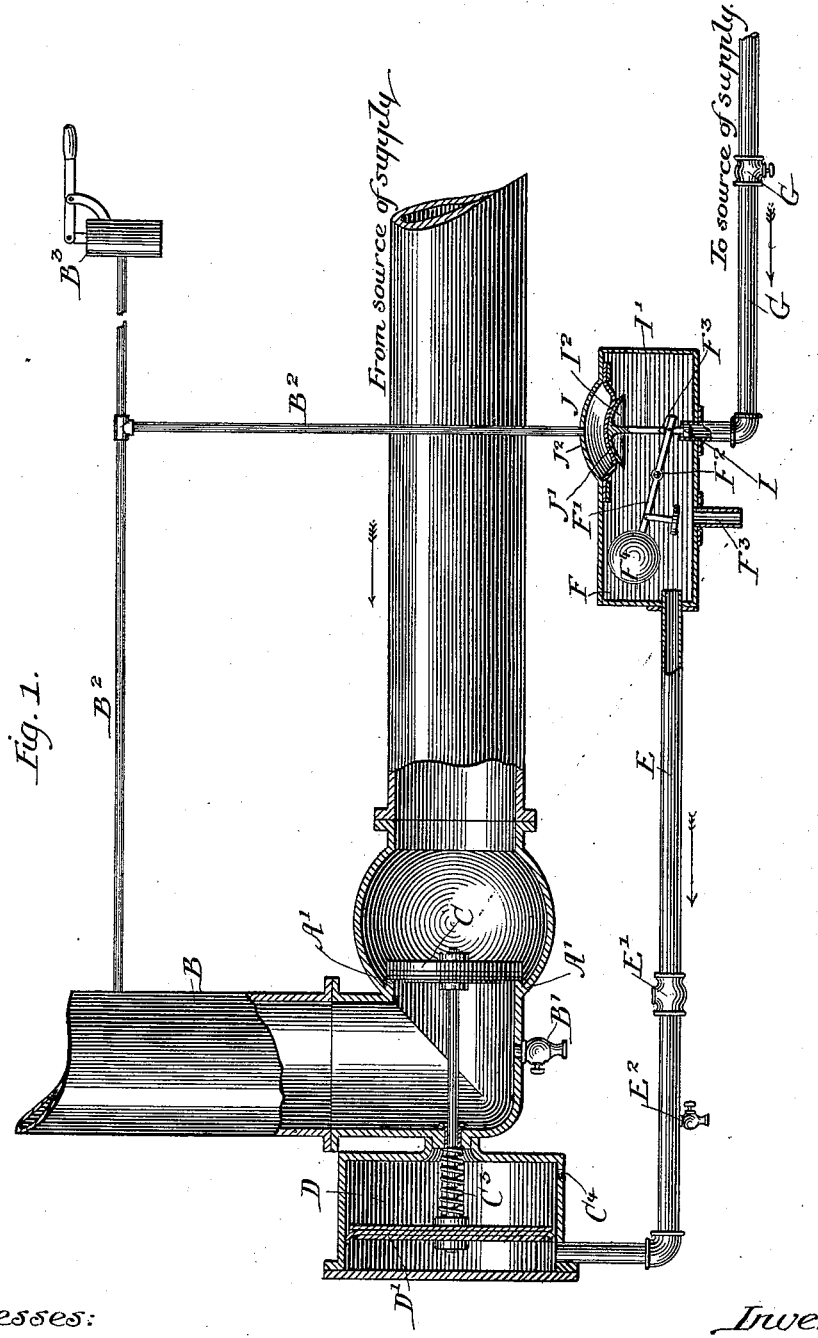

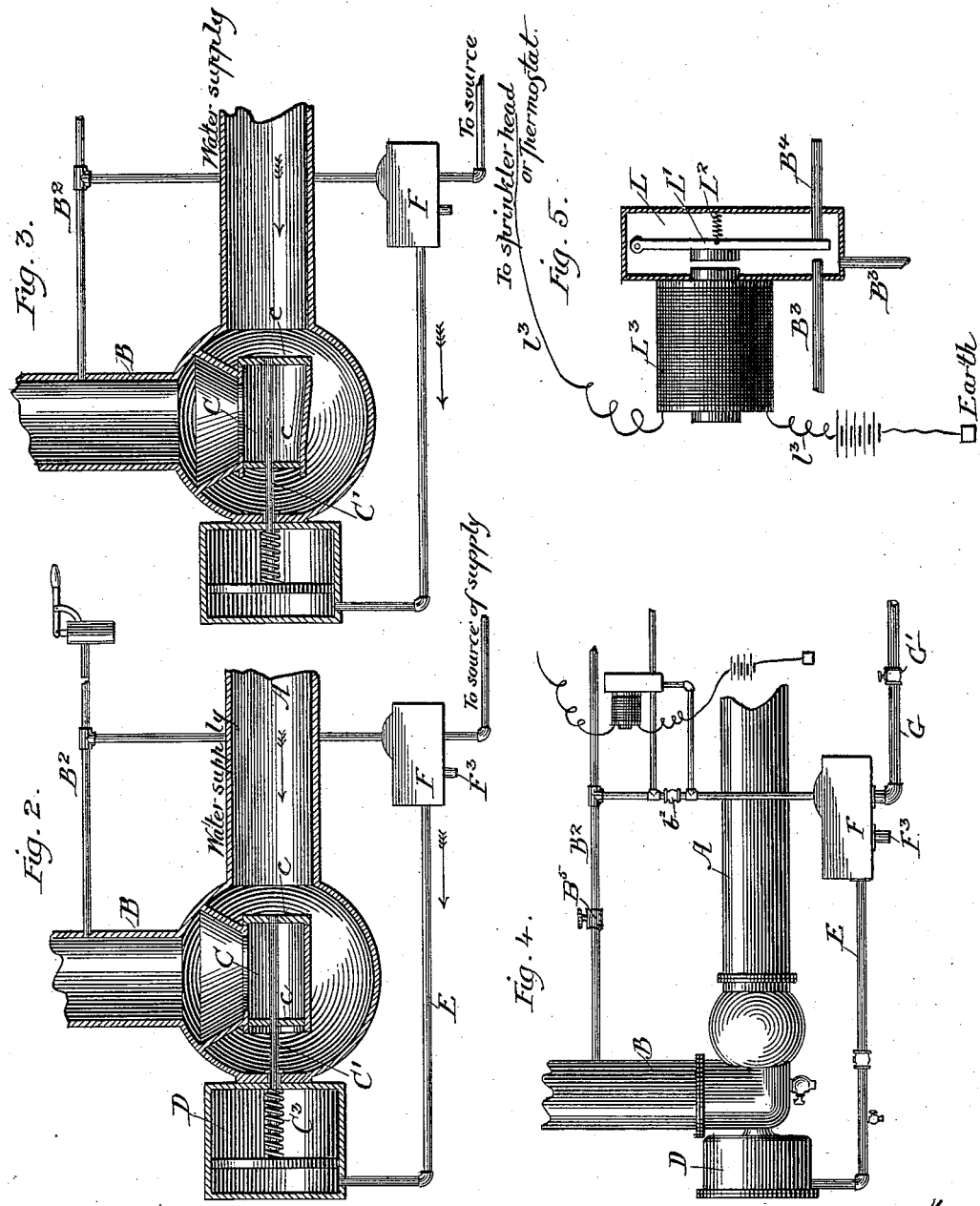

CHARLES LYMAN FORTIER, OF MILWAUKEE, WISCONSIN, ASSIGNOR TO GEORGE KNOWLES, JR., OF SAME PLACE.

AUTOMATIC VALVE FOR FIRE-EXTINGUISHERS.

SPECIFICATION forming part of Letters Patent No. 464,264, dated December 1, 1891.

Application filed October 12, 1889. Serial No. 326,826. (No model.)

*To all whom it may concern:*

Be it known that I, CHARLES L. FORTIER, a citizen of the United States, residing at Milwaukee, in the county of Milwaukee and State of Wisconsin, have invented certain new and useful Improvements in Automatic Fire-Extinguishers; and I do hereby declare the following to be a full, clear, and exact description of the invention, such as will enable others skilled in the art to which it appertains to make and use the same, reference being had to the accompanying drawings, and to letters of reference marked thereon, which form a part this specification.

This invention relates, particularly, to the control of the main pipe of an automatic fire-extinguishing apparatus consisting of water-pipes and automatic sprinkler-heads distributed through the building to be protected. In this art there has been used what is known as the "dry-pipe system," the same consisting of a series of pipes leading through the building and along the ceilings of rooms and provided along the ceilings with sealed automatic sprinkler-heads, such system of pipes communicating with the main pipe leading from the source of water-supply, and so located as to be protected from freezing. Some sort of valve is placed in the main pipe near its junction with the system of pipes extending through the building. Said valve is normally closed, so as to prevent the flow of water from the main pipe, and the space within the pipes within the building is filled with air compressed more or less, according to the needs of the case. The object in filling the system of pipes with air in lieu of water is to obviate freezing and corrosion. In this class of apparatus the sprinkler-heads have been so arranged as to open automatically when there is abnormal heat, and various means have been applied for simultaneously opening the valve in the main pipe and various forms of such a valve have been used; but, so far as I have ascertained, all such valves are held against the pressure of the water and in constant danger of unseating by faulty action of parts connected therewith, and whose function it is to hold or assist in holding said valve upon its seat against the pressure of the water.

In my apparatus I have provided a valve whose connecting parts are all normally idle and which is held positively against its seat by the water in the main pipe. So long as said valve is not removed by a positive extraneous force it remains firmly seated against its seat, and it can only be removed by pressing it in the direction whence the water comes and against the force of the water. I have provided for the forcible unseating of said valve by means of water or other fluid pressure, the supply of which is controlled by a supplemental valve, which is operated by undue heat in the rooms of the building. The system may also be operated with open dry pipes—that is, pipes from which the water is excluded and which are open to the outer atmosphere when not in use.

In the accompanying drawings, Figure 1 is a sectional elevation showing my improved apparatus. Figs. 2 and 3 show modifications of the form of apparatus shown in Fig. 1. Figs. 4 and 5 illustrate a modification in which electricity aids in controlling the subordinate valve.

I deem it unnecessary to show the apparatus for the entire system, because the portions of the apparatus which I do not show are well understood by those familiar with this art. Any of the well-known forms of sprinkler-heads and of water-distributing pipes may be used.

Referring first to Fig. 1, A is the water-main, and B is the lower portion of the rising pipe, from which the pipes bearing the sprinkler-heads branch. The lower end of the pipe B is joined by an elbow or otherwise to the pipe A, so as to communicate freely with the latter, excepting as hindered by the valve C. The flow of water in the pipe A is toward the valve C, as indicated by the arrow. On the side of the valve C opposite the arrow is the valve-seat A'. It is obvious that under this arrangement the water-pressure will be against the valve C and will press the latter against the seat A' and hold the same there so long as the water-pressure continues or until said pressure is overcome by another force from the opposite direction. With this valve in place any water in the pipe B may be withdrawn through the petcock B'. Then on closing the latter additional air may be pumped into the pipe B through the air-pipe $B^2$ by means of the air-pump $B^3$, communicating with said pipe $B^2$. This pumping may be continued until the air within the pipe B is compressed to the desired extent. After this has been done the pipe A stands filled with water under pressure and holds the valve C against its seat, as already described, while at the same time the pipe B remains filled with compressed air. This is the normal condition of these pipes and the valve. When the apparatus is to operate in case of fire, the air in the pipe B is to be released and the valve C is to be opened or unseated to allow the flow of water from the pipe A into the pipe B. The air in the pipe B is released by the opening of the sprinkler head or heads subjected to undue heat. $C'$ is the stem of the valve C and extends through the wall of the pipe B opposite the pipe A into the chamber D, in which latter it is connected with a piston or similar movable part $D'$, the circumference of which fits against the walls of the chamber D. At the opening in the wall of the chamber D the valve-stem $C'$ is surrounded by a suitable packing $C^2$. Between said wall and the piston $D'$ a spring $C^3$ may surround the stem $C'$ for the purpose of aiding in shifting the piston, valve-stem, and valve to the left, and a vent-port $C^4$ may be placed in the wall of the chamber D at its right. A pipe E leads from that portion of the chamber D at the left of the piston $D'$ to subordinate valve-chamber F. From said valve-chamber a pipe G leads to a source of water or other fluid supply.

I is any suitable valve fitted to the mouth of the pipe G. The drawings show said valve as entering the mouth of said pipe and as having the rising stem $I'$ surrounded above by a broadened head $I^2$. This valve is operated by an atmospheric regulator J, which has at its lower portion the flexible diaphragm $J'$, resting upon the head $I'$, and which has at its upper side the fixed arched wall $J^2$. The air-pipe $B^2$, leading from the pipe B, opens into the regulator J through the wall $J^2$. When the pipe B is filled with compressed air, the latter extends into the regulator J and depresses the diaphragm $J'$, valve-stem $I'$, and valve I, so that the mouth of the pipe G is closed and the flow of water or other fluid from the latter into the valve-chamber F is prevented.

$F'$ is a lever fulcrumed to a fixed support $F^2$ and to the valve-stem I at $F^3$. At the opposite end it is provided with the weight $F^4$.

$F^6$ is a drain in the lower wall of the chamber F, and $F^5$ is a valve supported by the lever $F'$ at the side of the fulcrum opposite the valve I and arranged to be depressed so as to close the drain $F^6$ when said lever is tilted, so as to raise the valve I.

Normally the diaphragm $J'$ is depressed, the valve I closed, and the drain $F^6$ open. The object of the drain $F^6$ is to form escape for water from the pipe E and the chamber F. A check-valve $E'$ is placed in the pipe E to prevent a return of water from the chamber D.

$E^2$ is a petcock located between the chamber D and the check-valve $E'$ for the purpose of draining that portion of the pipe E. When the air-pressure in the pipe B is released by the opening of one or more of the sprinkler-heads, the air-pressure in the regulator J is also released and the valve I and its stem $I'$ are allowed to rise in response to the fluid-pressure in the pipe G and the lifting action of the weight $F^4$, exerted through the lever $F'$ and the fulcrum $F^2$. With the ascent of the valve I the pipe G is opened and at the same time the drain $F^6$ is closed by the descent of the valve $F^5$. The water then flows from the pipe G, and after filling the chamber F flows through the pipe E into that portion of the chamber D at the left of the piston $D'$. The area of the piston $D'$ being greater than the area of the valve C, the force exerted upon the piston $D'$ will be in excess of the force exerted in the opposite direction upon the valve C. Consequently the piston $D'$, valve-stem $C'$, and valve C will be driven to the right until the piston $D'$ rests against the right wall of the chamber D. Free communication is thus established between the pipes A and B and the water flows from the former into the latter and upward through the latter to the open sprinkler-heads. As the water thus ascends it drives the air upward before it and out through the open sprinklers. As soon as the water from the pipe G fills the chamber F said water will press against the lower portion of the diaphragm $J'$, so as to equal the indirect pressure of the water rising in the pipe B. The diaphragm $J'$ being thus balanced or substantially balanced, the weight $F^4$ serves as a preponderance and keeps the diaphragm $J'$, stem $I'$, and valve I raised, while at the same time it keeps the valve $F^5$ down upon the drain $F^6$. When it is desired to again close the valve C, the valve $G'$ on the pipe G may be closed to stop the flow of fluid into the chamber F and the petcock $E^2$ in the pipe E may be opened to relieve the pressure of water at the left of the piston $D'$. The pressure of the water in the pipe A and the force of the spring $C^3$ will then shift the valve C, the valve-stem $C'$, and the piston $D'$ to the left until the valve C is again upon its seat.

The lever $F'$ is in fact a shifting member of the apparatus, which while in one position holds the subordinate valve closed and the drain-valve open and in the other position holds said valves in the reversed relation.

In Fig. 2 the parts are the same as those shown in Fig. 1, excepting that the valve C has two heads $c\,c$, which constitute a balanced valve, and which heads are moved away from their seats when the valve-stem $C'$ is shifted to the right. This valve is held closed normally by the spring $C^3$.

Fig. 3 shows a construction similar to that shown by Fig. 2, excepting that a differential valve is used in lieu of a balanced valve. The head $c$ at the right is larger than the one at the left, so that the water-pressure will hold the entire valve to the left.

Figs. 4 and 5 show the apparatus as it is shown in Fig. 1, excepting that an electrically-controlled valve is added to the pipe $B^2$ for the release of the air in said pipe and the regulator J. $B^3$ is a by-path applied to the pipe $B^2$, upon which is placed the valve-chamber L, each section of the by-path $B^3$ entering said valve-chamber L independent of the other. Opposite one opening of the by-path $B^3$ in the chamber L is an outlet-pipe $B^4$. An arm L′ is pivoted by its upper end within the chamber L, and has its lower end extending into the space between the opening $B^4$ and the opposite opening of the by-path $B^3$. A spring $L^2$ is joined to the arm L′ and to the wall of the chamber L, in which is located the opening $B^4$, and said spring holds said arm normally over said opening, so as to prevent the escape of air from said chamber. In this position the two sections of the by-path $B^3$ are in communication through the chamber L, and the compressed air in the pipe B may extend through said by-path and the pipe $B^2$ into the regulator J. A check-valve $b^2$ is located in the pipe $B^2$ between the ends of the by-path $B^3$. Said check-valve is so set as to check against the passage of air toward the chamber F. $L^3$ is an electro-magnet placed adjacent to the arm L′, opposite the spring $L^2$ and the opening $B^4$. The wires $l^3$ are part of an electric circuit leading from the electro-magnet $L^3$ to the sprinkler-heads or independent thermostats in the rooms to be protected. Upon the closing of the circuit the electro-magnet $L^3$ draws the arm L′ toward it, so as to open the opening $B^4$ and close the opposite end of the upper section of the by-path $B^3$. Thus the air within the regulator J may escape through the lower portion of the pipe $B^2$ and the lower section of the by-path $B^3$ and the opening $B^4$, and when the air-pressure has been thus released in the regulator the subordinate valve I is operated. By the addition of this electrically-controlled air-valve greater promptness in the action of the subordinate valve I is secured. If the sprinkler-head opens promptly in response to the heat of the room, the air-pressure is thereby released. If, on the other hand, the sprinkler-head is delayed in opening, the thermostat may be expected to promptly close the electric circuit, whereby the air-pressure in the regulator is released through the opening $B^4$, so that the valve C is opened and the pipe B filled with water by the time the sprinkler-head has responded to the heat. The electrical apparatus may also be operated on a closed circuit. To this end the magnet $L^3$ and the spring $L^2$ are to be transposed, so that the magnet will hold the arm L′ normally against the opening $B^4$, while the spring $L^2$ will, when the circuit is broken, draw said arm away from said opening and press it against the opposite section of the by-path $B^3$.

When it is desired to operate the apparatus as an open dry-pipe system, the cut-off valve $B^5$ in the upper portion of the pipe $B^2$ may be closed, so that the compressed air will extend only from said cut-off into the regulator J. Then the air-pressure is released solely by means of the electrically-controlled valve.

It is to be understood that a diaphragm may be used instead of the piston D′ and that the fluid used to exert pressure in the chamber D may be air or steam or any other fluid which it is convenient to supply for this purpose.

I do not broadly claim herein the use of the chamber D and head D′ for controlling the main valve, this being made the subject-matter of an application filed by me March 29, 1889, Serial No. 305,230.

I do not broadly claim as my invention the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open said valve, and a subordinate valve for controlling the flow of fluid through said last-mentioned pipe; nor do I broadly claim the combination, with a water-supply pipe and a rising pipe communicating therewith, of a valve resting over a valve-seat toward said water-supply pipe, a valve-stem extending from said valve in a direction opposite to said supply-pipe into a chamber and attached to a piston in said chamber, a fluid-supply pipe leading into that portion of the chamber at the side of the piston opposite to said valve-stem, a subordinate valve for controlling the flow of fluid in said last-mentioned pipe, an atmospheric regulator for controlling said subordinate valve, and a pipe leading from said atmospheric regulator to the rising pipe, and means for releasing the air from said air-regulator.

I claim as my invention—

1. In an automatic fire-extinguishing apparatus, the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open said valve, an automatic subordinate valve normally closed for controlling the flow of fluid through said last-mentioned pipe, and an automatic drain-valve between said subordinate valve and the movable wall of said expansion-chamber and normally open, substantially as shown and described.

2. In an automatic fire-extinguishing apparatus, the combination, with the water-supply pipe, of a valve resting on a valve-seat toward the source of water-supply, an expansion-chamber normally free from pressure, a valve-stem connecting said valve to the movable wall of said expansion-chamber, a fluid-supply pipe leading into that portion of the expansion-chamber from which said movable wall moves to open said valve, a subordinate valve for controlling the flow of fluid through said last-mentioned pipe, a drain-valve between said subordinate valve and the movable wall of said expansion-chamber, a shiftable member which in its normal position closes the subordinate valve and leaves the drain-valve open and in its abnormal position closes the drain-valve and leaves the subordinate valve open, and means for controlling said shiftable member, substantially as shown and described.

3. In an automatic fire-extinguishing apparatus, the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open said valve, a subordinate valve for controlling the flow of fluid through said last-mentioned pipe, and a drain-valve between said subordinate valve and the movable wall of said expansion-chamber, and a shiftable member arranged in such relation as that it will, when shifted into one position, operate said subordinate valve and when shifted into a second position operate said drain-valve, the former position being normal, so that said subordinate valve is normally closed and the drain-valve normally open, and a subordinate expansion-chamber for controlling said shiftable member, substantially as shown and described.

4. In an automatic fire-extinguishing apparatus, the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open the valve, an automatic subordinate valve normally closed for controlling the flow of fluid through said last-mentioned pipe, and a check-valve located in said last-mentioned pipe between said subordinate valve and said expansion-chamber and arranged to allow flow in the direction of said expansion-chamber, substantially as shown and described.

5. In an automatic fire-extinguishing apparatus, the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open the valve, an automatic subordinate valve normally closed for controlling the flow of fluid through said last-mentioned pipe, and a check-valve located in said last-mentioned pipe between said subordinate valve and said expansion-chamber and arranged to allow flow in the direction of said expansion-chamber, and a petcock located between said check-valve and the movable wall of said expansion-chamber, substantially as shown and described.

6. In an automatic fire-extinguishing apparatus, the combination, with the water-supply pipe, of a valve resting on a valve-seat toward the source of water-supply, an expansion-chamber, a valve-stem connecting said valve to the movable wall of said expansion-chamber, a fluid-supply pipe leading into that portion of the expansion-chamber from which said movable wall moves to open the valve, an automatic subordinate valve normally closed for controlling the flow of fluid through said last-mentioned pipe, and an automatic drain-valve in said last-mentioned pipe between said subordinate valve and said expansion-chamber and normally open, and a check-valve located between the movable wall of said expansion-chamber on the one hand and said subordinate and drain valves on the other hand, substantially as shown and described.

7. In an automatic fire-extinguishing apparatus, the combination, with the water-supply pipe, of a main valve, an expansion-chamber, a valve-stem connecting said valve to the movable wall of said expansion-chamber, a fluid-supply pipe leading into that portion of the expansion-chamber from which said movable wall moves to open the valve, an automatic subordinate valve normally closed for controlling the flow of fluid through said last-mentioned pipe, and an automatic drain-valve in said last-mentioned pipe between said subordinate valve and said expansion-chamber, and a shiftable member arranged in proper relation for controlling said subordinate valve and said drain-valve, and means for actuating said shiftable member, substantially as shown and described.

8. In an automatic fire-extinguishing apparatus, the combination, with the water-supply pipe, of a main valve, an expansion-chamber, a valve-stem connecting said valve to the movable wall of said expansion-chamber, a fluid-supply pipe leading into that portion of the expansion-chamber from which said movable wall moves to open the valve, an automatic subordinate valve normally closed for controlling the flow of fluid through said last-mentioned pipe, and an automatic drain-valve in said last-mentioned pipe between said subordinate valve and said expansion-chamber, and a shiftable member arranged in proper relation for controlling said subordinate valve and said drain-valve, and a subordinate expansion-chamber for controlling said shiftable member, substantially as shown and described.

9. In an automatic fire-extinguishing apparatus, the combination, with the water-supply pipe, of a main valve for closing said pipe, an expansion-chamber, a valve-stem connecting said valve and the movable wall of said expansion-chamber, a fluid-supply pipe leading into said expansion-chamber, a subordinate valve for controlling the flow in said last-mentioned pipe, a subordinate expansion-chamber, a valve-stem leading from said subordinate valve to the movable wall of said subordinate expansion-chamber and arranged in permanent engagement with said movable wall, and a weight connected with said subordinate valve in such manner as to lift the latter from its seat when the pressure from the subordinate expansion-chamber has been released, substantially as shown and described.

10. In an automatic fire-extinguishing apparatus, the combination, with the water-supply pipe, of a main valve for closing said pipe, an expansion-chamber normally free from pressure, a valve-stem connecting said valve and the movable wall of said expansion-chamber, a fluid-supply pipe leading into said expansion-chamber and having a subordinate valve, and an automatic drain-valve located between said subordinate valve and the movable wall of said expansion-chamber, substantially as shown and described.

11. In an automatic fire-extinguishing apparatus, the combination, with the water-supply pipe, of a main valve for closing said pipe, an expansion-chamber normally free from pressure, a valve-stem connecting said valve and the movable wall of said expansion-chamber, a fluid-supply pipe leading into said expansion-chamber and having an opening to the atmosphere and having a subordinate valve and a drain-valve located between the movable wall of said expansion-chamber and said subordinate valve, and a subordinate expansion-chamber for controlling said subordinate valve and said drain-valve, substantially as shown and described.

12. In an automatic fire-extinguishing apparatus, the combination, with the water-pipe A and the rising pipe B, communicating with the pipe A, of a valve C, resting on a valve-seat toward the pipe A, a valve-stem extending from said valve in the direction opposite the pipe A into a chamber D and attached to a piston D' in said chamber D, a fluid-supply pipe leading into that portion of the chamber D at the side of the piston D' opposite the valve-stem C', a subordinate valve for controlling the flow of fluid in said last-mentioned pipe, and an atmospheric regulator adapted to be filled with compressed air for controlling said subordinate valve, and an electrically-controlled air-valve communicating with said atmospheric regulator, substantially as shown and described.

13. In an automatic fire-extinguishing apparatus, the water-supply pipe A and the rising pipe B, communicating with the pipe A, of a valve C, resting on a valve-seat toward the pipe A, a valve-stem extending from said valve in the direction opposite the pipe A into the chamber D and attached to a piston D' in said chamber D, a fluid-supply pipe leading into that portion of the chamber D at the side of the piston D' opposite the valve-stem C', a subordinate valve for controlling the flow of fluid in said last-mentioned pipe, an atmospheric regulator for controlling said subordinate valve, and a pipe leading from said atmospheric regulator to the rising pipe B, a check-valve resting on the latter pipe, a by-path extending around said check-valve, and an electrically-controlled air-valve in said by-path, substantially as shown and described.

In testimony whereof I affix my signature, in presence of two witnesses, this 1st day of October, 1889.

CHARLES LYMAN FORTIER.

Witnesses:
CYRUS KEHR,
GEO. E. FOSS, Jr.